US008718567B2

(12) United States Patent
Venkataraman et al.

(10) Patent No.: US 8,718,567 B2
(45) Date of Patent: May 6, 2014

(54) METHODS FOR CALIBRATING RADIO-FREQUENCY RECEIVERS USING CODE DIVISION MULTIPLE ACCESS TEST EQUIPMENT

(75) Inventors: Vishwanath Venkataraman, San Francisco, CA (US); Justin Gregg, San Francisco, CA (US); Wassim El-Hassan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1003 days.

(21) Appl. No.: 12/732,108

(22) Filed: Mar. 25, 2010

(65) Prior Publication Data

US 2011/0237199 A1    Sep. 29, 2011

(51) Int. Cl.
*H04B 17/00* (2006.01)
*H03C 1/62* (2006.01)

(52) U.S. Cl.
USPC ............... 455/67.11; 455/67.14; 455/115.1

(58) Field of Classification Search
USPC ............................... 455/67.11, 67.14, 115.2
See application file for complete search history.

(56) References Cited

U.S. PATENT DOCUMENTS

| 5,845,208 | A | 12/1998 | Hottinen et al. |
|---|---|---|---|
| 6,137,773 | A | 10/2000 | Stilwell et al. |
| 6,445,916 | B1 | 9/2002 | Rahman |
| 6,577,671 | B1 * | 6/2003 | Vimpari ........................ 375/146 |
| 6,826,411 | B2 | 11/2004 | Dick et al. |
| 7,551,587 | B2 | 6/2009 | Iacono et al. |
| 7,711,386 | B2 | 5/2010 | Sung et al. |
| 7,773,964 | B2 | 8/2010 | Ozaki et al. |
| 7,813,756 | B2 | 10/2010 | Okamoto et al. |
| 8,000,656 | B1 * | 8/2011 | Jiao et al. .................... 455/67.11 |
| 2001/0038328 | A1 * | 11/2001 | King et al. .................... 340/5.64 |
| 2005/0041630 | A1 * | 2/2005 | Goria et al. .................... 370/342 |
| 2005/0176375 | A1 | 8/2005 | Bednasz et al. |
| 2008/0049697 | A1 * | 2/2008 | Breuer et al. ................. 370/341 |
| 2008/0242339 | A1 * | 10/2008 | Anderson ...................... 455/522 |
| 2009/0197547 | A1 | 8/2009 | Wang |
| 2009/0280835 | A1 * | 11/2009 | Males et al. ............... 455/456.5 |

* cited by examiner

*Primary Examiner* — Temesgh Ghebretinsae
*Assistant Examiner* — Devan Sandiford
(74) *Attorney, Agent, or Firm* — Treyz Law Group; G. Victor Treyz; Jennifer Luh

(57) ABSTRACT

Wireless test equipment may be used to perform over-the-air testing of user equipment. The user equipment may contain an antenna and a receiver. The wireless test equipment may contain a call box that performs network-level testing by sending and receiving protocol-compliant network messages. The call box may transmit a radio-frequency test signal at a predetermined power. The antenna in the user equipment may receive the radio-frequency test signal and may provide the received radio-frequency test signal to the input of the receiver. The call box may send a network message such as a code-division-multiple-access intercode handover command to the user equipment to direct the user equipment to measure the received radio-frequency test signal power at the input of the receiver. The measured power may be transmitted to the call box as part of a pilot measurement message indicator, using an intercode handover command, or using other network messages.

15 Claims, 3 Drawing Sheets

| CODE 0 | COMMANDS UE TO MEASURE $P_{IN}$ |
|---|---|
| CODE 6 | INDICATES $P_{IN}$ EQUALS -105dBm |
| CODE 7 | INDICATES $P_{IN}$ EQUALS -106dBm |
| CODE 8 | INDICATES $P_{IN}$ EQUALS -107dBm |
| ⋮ | ⋮ |

FIG. 2

METHODS FOR CALIBRATING RADIO-FREQUENCY RECEIVERS USING CODE DIVISION MULTIPLE ACCESS TEST EQUIPMENT

BACKGROUND

This relates to testing, and more particularly, to wireless testing of electronic devices.

Electronic devices such as cellular telephones and portable computers contain wireless communications circuitry. A typical device contains an antenna coupled to a radio-frequency transceiver and an associated processor. During data transmission operations, the processor supplies data to the radio-frequency transceiver. A radio-frequency transmitter in the transceiver transmits the data using the antenna. During data reception operations, a receiver in the radio-frequency transceiver receives radio-frequency signals through the antenna and passes these signals to the processor.

Wireless electronic devices such as these are generally tested during manufacturing. When a wireless electronic device is being tested, the device is typically referred to as a device under test (DUT). The radio-frequency performance of a device under test may be tested using wired and wireless connections. With a typical wired test, a test probe is connected to a connector on a printed circuit board in the device. The connector may, for example, be interposed in a transmission line path between the transceiver and the antenna. The probe may tap into the transmission line to perform test measurements. For example, the test probe may be used to make measurements on the amount of power received through the antenna.

Wired tests such as these may be helpful in determining whether a device is functioning properly, but may not be sufficient in many situations. For example, wired measurements that bypass the antenna are not able to test for proper antenna functionality. Wireless measurements at a connector do not provide a direct measurement of the amount of radio-frequency signal power that is actually received at the input to the receiver, because the connector for the wired tap point is upstream from the receiver. Moreover, use of a cable to form a wired connection between a tester and a device under test introduces a conductive element into the test environment. Because the cable can influence the distribution of radio-frequency signals in the vicinity of the device under test, accurate wireless measurements can be difficult in the presence of the cable.

Wireless testing avoids some of these shortcomings of wired radio-frequency tests. With wireless testing, test equipment exchanges wireless signals with the device under test. The type of testing that is performed depends on the type of tester that is used. Low level tests (i.e., physical layer tests) can be performed using relatively simple equipment such as power meters. A power meter may, for example, be used to measure how much radio-frequency power is being transmitted by a device under test. Higher level tests (e.g., network layer tests) can be performed using complex test equipment such as call boxes. High level tests may, for example, involve the transmission and reception of protocol-compliant wireless test messages. These high level tests may be used to evaluate how well a device under test performs typical network layer tasks.

Although a variety of test equipment is available for performing wireless tests, there are gaps in test coverage. For example, existing wireless test techniques are not able to measure how much power is actually received at the radio-frequency receiver in the device under test.

Power meter equipment and other external test equipment is not able to measure received power levels in the device under test, because wired probes can only connect to the device under test at connector locations that bypass antennas and that are located upstream from the receiver and because wired test probes tend to disturb the wireless environment of the device.

Call boxes and other test equipment that handles network layer testing is typically only able to exchange predetermined protocol-compliant network messages with the device under test. For example, call boxes that handle code division multiple access (CDMA) protocols are only able to handle CDMA network messages that are compliant with CDMA protocols. These protocols do not include network message formats for transmitting receiver power measurements.

It would therefore be desirable to provide improved ways in which to make measurements on the amount of radio-frequency signal power that is received by the receiver in an electronic device.

SUMMARY

Wireless test equipment may be used to perform over-the-air testing of user equipment. The user equipment may be, for example, a cellular telephone, media player, portable computer, or other equipment that contains wireless circuitry. The user equipment may contain an antenna and a receiver. To ensure that the user equipment is functioning properly, the antenna may be used to receive a test signal that has been transmitted from the wireless test equipment at a predetermined power. The received test signal may be provided to an input of the receiver.

The wireless test equipment may contain a call box that performs network-level testing by sending and receiving protocol-compliant network messages. During testing, the call box may transmit a network message such as a code-division-multiple-access intercode handover command to the user equipment that directs the user equipment to measure the received radio-frequency test signal power at the input of the receiver.

In response to receiving the command from the test equipment, the user equipment may measure the test signal power at the receiver input. The value of the measured power may be returned to the call box wirelessly using network messages.

For example, the measured power value may be transmitted to the call box as one of the fields in a pilot measurement message indicator. The measured power value may replace a field that would otherwise be contained in the pilot measurement message indicator. If desired, other network messages may be used to transmit the measured power value to the call box. For example, the measured power value may be wirelessly provided to the call box by encoding the measured power value in intercode handover commands that are sent from the user equipment to the call box.

Further features of the invention, its nature and various advantages will be more apparent from the accompanying drawings and the following detailed description of the preferred embodiments.

BRIEF DESCRIPTION OF THE DRAWINGS

FIG. 2 is a table illustrating an illustrative encoding scheme that may be used to send control commands and measured data between test equipment and user equipment in the form of protocol-compliant network messages in accordance with an embodiment of the present invention.

DETAILED DESCRIPTION

Electronic devices may be provided with wireless communications circuitry. The wireless communications circuitry may be used to support wireless communications such as cellular telephone communications or other wireless communications.

Due to manufacturing variations, there is generally a device-to-device variation in wireless performance. For example, the antennas and transmission lines in some devices may be more efficient at receiving radio-frequency signals and in conveying those signals to receiver circuitry on the devices than the antennas and transmission lines in other devices. Testing and calibration operations may be performed during manufacturing to ensure that finished devices operate properly in the field.

Figure 1:
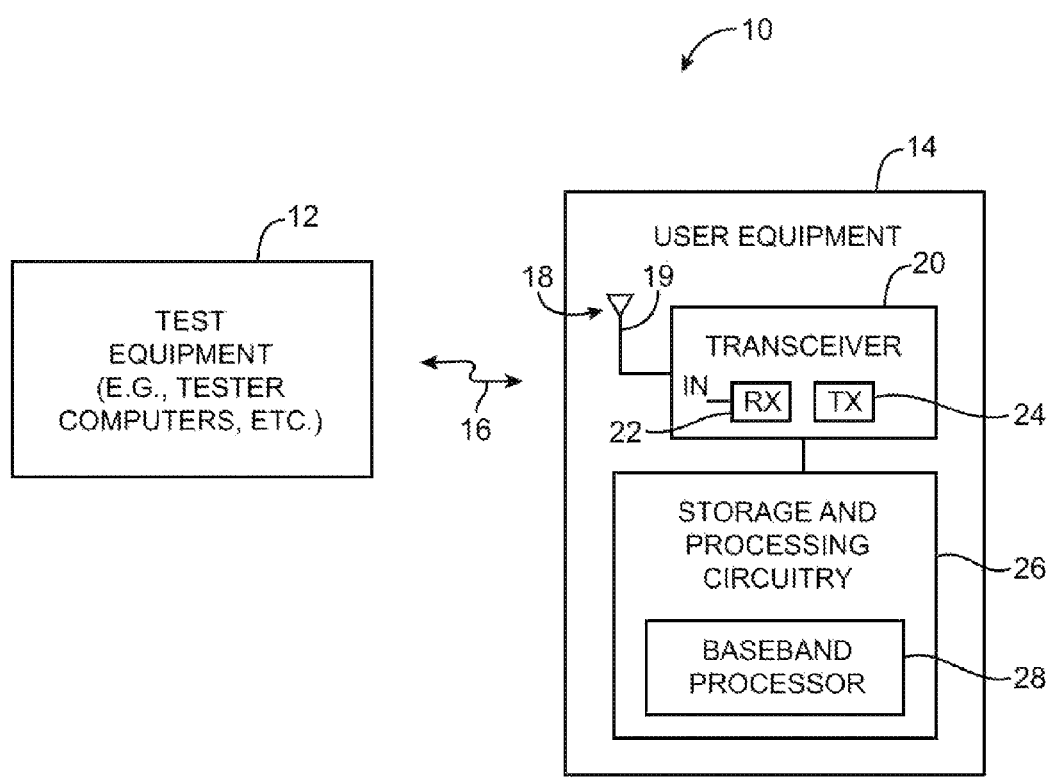
FIG. 1 is a diagram of an illustrative system in which test equipment may be used to test how much signal power is received by the receiver in a device under test in accordance with an embodiment of the present invention.

A test system of the type that may be used to make wireless test measurements on electronic devices is shown in FIG. 1. As shown in FIG. 1, test system 10 may include test equipment 12. Test equipment 12 may include one or more testers. The testers in test equipment 12 may include radio communications testers of the type that are sometimes referred to as call boxes or wideband radio communications testers. Test equipment 12 may, for example, include a call box such as the CMW500 Wideband Radio Communication Tester available from Rohde & Schwarz. Testers of this type may perform radio-frequency signaling tests for a variety of different radio-frequency communications bands and channels. For example, this type of tester may be used in performing network emulation functions by sending and receiving protocol-compliant network messages (e.g., messages compliant with a wireless communications protocol such as the CDMA2000 standard). Wireless tests such as these are sometimes referred to as over-the-air tests and can be used in confirming whether user equipment meets or exceeds carrier and manufacturer specifications. Computers may be connected to the testers of test equipment 12 (e.g., to control data acquisition and data processing functions).

The testers in test equipment 12 may be used directly or via computer control. When operated directly, a user may control a tester by supplying commands directly to the tester using the user input interface of the tester. For example, a user may press buttons on the tester while viewing information that is displayed on a display in the tester. In computer controlled configurations, a computer (e.g., software running autonomously or semi-autonomously on the computer) may communicate with the tester (e.g., by sending and receiving data over a wired or wireless path between the computer and the tester).

Test equipment 12 may communicate with user equipment 14 over wireless paths such as path 16. To reduce signal interference, user equipment 14 may be housed in a test chamber during wireless testing. An antenna in the test chamber may be coupled to test equipment 12 using a cable.

User equipment 14 may be an electronic device such as a computer, a tablet computer, a laptop computer, a media player, a handheld computing device, a cellular telephone, a gaming device, an electronic book, or any other suitable electronic device. In test environments of the type shown in FIG. 1, user equipment 14 is being tested, so user equipment 14 may sometimes be referred to as a device under test (DUT).

As shown in FIG. 1, user equipment 14 has one or more antennas such as antenna 18. Antenna 18 may be coupled to a receiver such as receiver 22 and a transmitter such as transmitter 24 in radio-frequency transceiver 20. Filter and matching circuitry may be provided in transmission line path 19 between antenna 18 and transceiver 20 (e.g., to route received and transmitted radio-frequency antenna signals by frequency, to perform impedance matching, etc.).

Storage and processing circuitry 26 may include nonvolatile and volatile memory and may include processing circuitry such as microprocessors, microcontrollers, digital signal processors, and application-specific integrated circuits. For example, storage and processing circuitry 26 may include one or more integrated circuits that implement the functions of baseband processor 28. Processor 28 and other processing circuitry in storage and processing circuitry 26 may be used to generate data that is transmitted over antenna 18 using transmitter 24. Processor 28 and other processing circuitry in storage and processing circuitry 26 may also be used to receive and process information that has been received from antenna 18 using receiver 22.

During a typical data transmission operation, digital data is produced by storage and processing circuitry 26. Transmitter 24 transits a radio-frequency antenna signal that includes this data. The radio-frequency antenna signal is conveyed to antenna 18 via transmission line path 19 and is wirelessly emitted by antenna 18. During a typical data reception operation, radio-frequency antenna signals are sensed by antenna 18 and are conveyed to receiver 22 via transmission line path 19. Receiver 22 conveys received radio-frequency antenna signal data to baseband processor 28 and other storage and processing circuitry 26 for digital processing.

Proper operation of user equipment 14 relies on accurate fabrication of the conductive structures that make up antenna 18 and the accurate fabrication of the transmission line structures and electrical components in antenna signal path 19 and receiver 22. If, for example, the received radio-frequency antenna signal power Pin at input IN of receiver 22 is too high or too low, user equipment 14 may not operate satisfactorily. As an example, if the received radio-frequency antenna signals at input IN are too weak, receiver 22 may not be able to adequately receive these signals and the resulting data that is received by storage and processing circuitry 26 may contain undesirable errors.

During over-the-air testing with test equipment 12, the input power Pin to receiver 22 can be measured. Received antenna signals are routed to receiver 22 via path 19 and the associated filter and matching components that are interposed within path 19. In this type of test, user equipment 14 can be directed to use its resources (e.g., transceiver 20 and storage and processing circuitry 36) to measure the power Pin of the radio-frequency antenna signals that are being received by input IN of receiver 22 while a radio-frequency test signal of a predetermined power is emitted by test equipment 12.

If desired, the measured power of these received signals (i.e., Pin), which is sometimes referred to as "receive power" or "received power," can be used in calibrating user equipment 14 to compensate for manufacturing variations. Devices may be individually calibrated or may be calibrated in bulk, based on tests from a representative sample of devices. Once calibrated, low noise amplifiers or other input circuitry in equipment 14 can be automatically adjusted so that signals are properly received. Other actions may also be taken in response to receive power data. For example, user equipment 14 that is not receiving a sufficiently strong signal Pin at input IN of receiver 22 may be reworked on the factory line to improve performance or may be discarded.

Particularly in situations in which test equipment 12 includes protocol-compliant call boxes or other over-the-air test equipment that complies with wireless communications standards (e.g., the CDMA2000 standard), it may be challenging to wirelessly gather data on measured receive powers. This is because the wireless communications protocols that are implemented by such testers in test equipment 12 generally do not include provisions for performing this type of test or for uploading measured receive power data.

As an example, the CDMA2000 protocol provides for conventional over-the-air tests in which a call box directs a cellular telephone to make a measurement of the ratio of power in a CDMA pilot channel (Spilot) to the power in a traffic channel (Straffic). The measured ratio (Spilot/Straffic) is returned to the call box as one of the fields in a wireless pilot measurement message indicator (PMMI) network message. Conventional arrangements of this type are unable to measure Pin and return this information in an unobscured fashion to the call box.

System 10 of FIG. 1 may overcome this issue by embedding the value of Pin in a network message. With one suitable arrangement, the value of Pin that is measured by user equipment 14 may be written into one of the fields in a CDMA2000 PMMI message. For example, the value of Pin may be inserted into the PMMI message in the field that would normally be used for the ratio of Spilot/Straffic. When the PMMI message is uploaded to test equipment 12, the call box or other tester in test equipment 12 may extract the Pin data from the appropriate PMMI field. This information may then be processed manually (e.g., by a user examining the PMMI message on the display of a call box or computer) or automatically (e.g., by a processor in a call box or a computer that is collating and processing PMMI data and other test data that is gathered by the call box).

Information on Pin may also be uploaded from user equipment 14 to test equipment 12 by sending encoded intercode handover commands with particular (coded) values to the call box. Intercode handover commands are protocol-compliant network commands that are normally used to coordinate transitions between CDMA codes (i.e., chip codes). Consider, as an example, a cellular telephone that is communicating with a cellular base station during normal operation. Initially, the cellular telephone and base station may be communicating using a first code (e.g., code 0). During operation of the network, the base station may wish to use a different code for communicating with the cellular telephone. The base station may therefore send an intercode handover command to the cellular telephone that instructs the cellular telephone to change from using code 0 to using code 1. After the change is complete, further cellular transmissions between the base station and cellular telephone may take place using the updated code (i.e., code 1).

During testing with system 10, the presence of particular code values in the intercode handover commands can be exploited to implement a data encoding scheme. The data encoding scheme may be used by test equipment 12 to send control messages to user equipment 14. For example, test equipment 12 may send an intercode handover command to user equipment 14 to direct user equipment 14 to measure Pin at the input of receiver 22. The data encoding scheme may also be used by user equipment 14 to send data to test equipment 12. For example, user equipment 14 may send an intercode handover command to test equipment 12 that informs test equipment 12 of the value of Pin that was measured by user equipment 14 in response to receiving the command to make this measurement from test equipment 12.

Any suitable mapping between intercode handover command values and corresponding command and data values may be used in the encoding scheme. As just one example, user equipment 14 may interpret any intercode handover command from test equipment 12 that instructs user equipment 14 to change to code 0 as an instruction to measure Pin, as shown in the table of FIG. 2. When, in response, user equipment 14 measures that the value of Pin is equal to −105 dBm, user equipment 14 may send test equipment 12 a "code 6" intercode handover command. Different measured values of Pin can be conveyed to test equipment 12 using different corresponding intercode handover commands, as shown in the table of FIG. 2. For example, transmission of a "code 8" intercode handover command from user equipment 14 to test equipment 12 may indicate to test equipment 12 that user equipment 14 measured the value of Pin to be −107 dBm, etc.

Standard call boxes are able to send and receive network messages such as CDMA intercode handover commands in compliance with network standards (e.g., the CDMA2000 standard). Accordingly, the use of intercode handover commands or other protocol-compliant network messages to encode commands and data allows standard test equipment (i.e., standard protocol-compliant over-the-air test equipment such as protocol-compliant call boxes) to be used in test equipment 14. The test environment for testing user equipment 14 therefore need not change dramatically from that used during regular over-the-air testing, enhancing compatibility with legacy test systems.

To ensure that user equipment 14 is able to properly respond during testing, baseband processor 28 or other circuitry in storage and processing circuitry 26 may be configured to recognize incoming commands from test equipment 12 that have been encoded using network messages. For example, storage and processing circuitry 26 may be provided with software code and/or hardware capabilities to recognize that a "code 0" intercode handover command or other particular network message should be interpreted as a command to measure Pin at input IN of receiver 22. Storage and processing circuitry 26 of user equipment 14 may also be configured to return Pin values to test equipment 12 as a field in a CDMA protocol-compliant network message such as a PMMI message or other portion of a protocol-compliant network message or may be configured to use one or more intercode handover commands or other messages to convey the Pin value in encoded form (e.g., using an encoding scheme of the type described in connection with FIG. 2).

Because storage and processing circuitry 26 and test equipment 12 in system 10 can convey commands and Pin data in protocol-compliant network messages, Pin measurements can be gathered during over-the-air testing, thereby allowing the performance of antenna 18 and path 19 to be evaluated. Cables may, if desired, be connected to user equipment 14 (e.g., to supply power and/or data) or, preferably, user equipment 14 may be powered from an internal battery while tests are performed without connecting cables to equipment 14.

Figure 3:
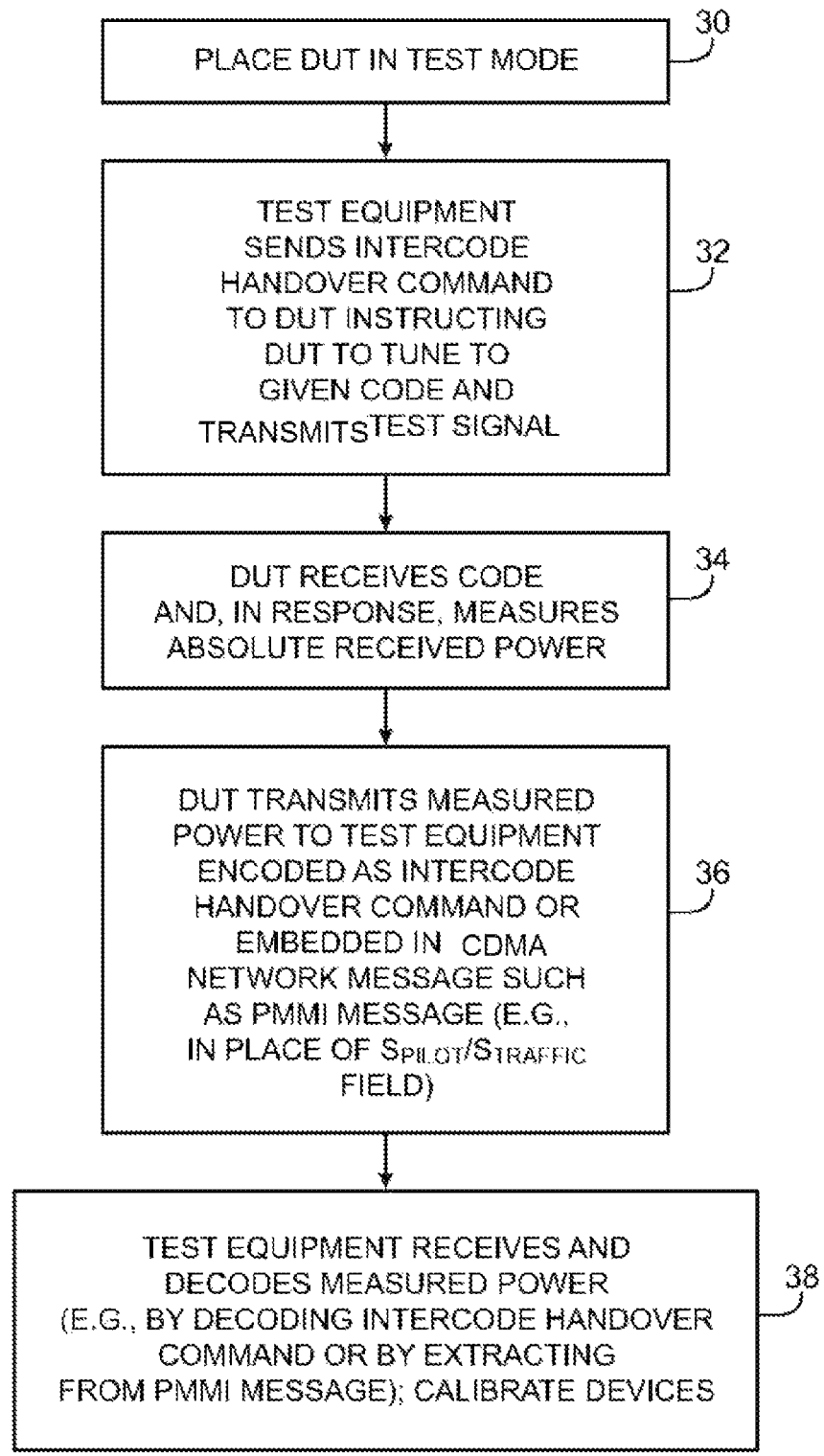
FIG. 3 is a flow chart of illustrative steps involved in testing and calibrating electronic devices using a wireless test system of the type shown in FIG. 1 in accordance with an embodiment of the present invention.

Illustrative steps involved in using system 10 of FIG. 1 to make test measurements on user equipment 14 such as receive power measurements are shown in FIG. 3.

At step 30, user equipment 14 (i.e., the device under test) may be placed into test mode. During test mode, test code may run on storage and processing circuitry 26 so that equipment 14 responds with test-specific actions. For example, in normal user mode, equipment 14 may respond to receipt of a "code 0" intercode handover command by changing to use of CDMA code 0 without further action, whereas in test mode receipt of this command may cause equipment 14 to take a Pin measurement. The test-specific functions that are implemented on user equipment 14 may be implemented using the test code and/or hardware features of storage and processing circuitry 26 and transceiver 20. Test code may be stored in storage in storage and processing circuitry 26 and may be run using one or more processors in processing circuitry 26. Test code may be provided as part of an operating system, as application code, as firmware, using combinations of these arrangements, etc. User equipment 14 may be placed in test mode by typing commands into equipment 14 using a user input interface in equipment 14, by sending wireless messages to equipment 14, by pressing a particular sequence of buttons on equipment 14, by loading and launching a test program, by launching test features that are embedded in preloaded code, etc.

Once user equipment 14 is operating in test mode, test operations may proceed at step 32. During the operations of step 32, test equipment 12 may send a wireless over-the-air testing command to user equipment 14 that directs user equipment 14 to use receiver 22 or other circuitry in transceiver 20 or equipment 14 to measure Pin at the input of receiver 22 (e.g., actions other than the actions normally taken when operating equipment 14 in the field in a cellular telephone network). As described in connection with FIG. 2, the command that test equipment 12 sends to user equipment 14 may be provided in the form of a CDMA protocol-compliant network message such as an intercode handover command or other suitable network message. Test equipment 12 also transmits a reference radio-frequency test signal of a known power to user equipment 10.

At step 34, user equipment 14 receives the command from test equipment 12 that directs user equipment 14 to measure Pin or that directs user equipment 14 to take other desired actions (e.g., by measuring other desired operating parameters or performing other tasks that are different from the tasks that would be performed in response to the command during operation of equipment 14 in a cellular telephone network). In response to receiving the command, user equipment 14 may measure power Pin. Because this radio-frequency signal power is measured at input IN of receiver 22 and because the corresponding transmitted signal from test equipment 12 was made at a known power, the measured input power Pin is indicative of the characteristics of antenna 18 and can be used to test and, if desired, to calibrate antenna and transmission line performance (including any associated electrical components such as matching components and filters). Such measurements of antenna performance and transmission line performance are not possible using conventional test probes that bypass antenna 18 by tapping into path 19 with a wired probe.

At step 36, user equipment 14 may transmit the measured value of the received radio-frequency signal power Pin to test equipment 12 using protocol-compliant network messages such as CDMA protocol-compliant network messages. The value of Pin may, for example, be transmitted to test equipment 12 as one of the fields in a PMMI message (e.g., in place of the field in the PMMI message that would otherwise be used to carry the Spilot/Straffic value). As described in connection with the table of FIG. 2, the value of Pin may also be conveyed by sending encoded intercode handover commands. The value of Pin may be embedded in the intercode handover commands or other such network messages using a coding scheme of the type shown in the table of FIG. 2 or other suitable coding schemes. If desired, these coding schemes may involve adjustments to the number and type of protocol-compliant messages that are sent, the timing of the messages, or other suitable coding schemes.

At step 38, test equipment 12 may receive and decode the information on Pin that was transmitted by user equipment 14. Test equipment 12 may, for example, receive a network message such as a PMMI message and may extract Pin from one of the fields in the PMMI message. If Pin is sent in the form of an encoded intercode handover command, the value of Pin may be obtained by receiving and decoding the intercode handover command using a table such as the table of FIG. 2. Test results (i.e., values of Pin for one or more devices under test) may be used in calibrating the device under test or may be used to calibrate a larger number of devices. For example, test results from one or more devices under test may be used to determine appropriate nominal settings for low noise amplifiers and other circuits in a batch of devices. Calibration results or other associated settings may be stored in the storage and processing circuitry of each device during manufacturing. When operated normally in the field, each calibrated device may use these calibration settings to ensure proper operation within desired specifications.

Measurement of received power at a receiver in a wireless transceiver is merely one example of the type of action that may be taken using test system 10 of FIG. 1. In general, any suitable action that is different from the normal response to a network message may be taken in response to receipt of a network message during test mode operations. Examples of other actions that may be taken in response to receiving an encoded network message at the user equipment include measuring other radio-frequency powers, measuring power supply voltages, measuring other operating powers, adjusting device settings, changing test modes, etc. Because these actions can be programmed into user equipment 14, a variety of test actions may be taken during over-the-air testing in addition to the normal actions that equipment 14 takes when responding to a particular received network message. By configuring the user equipment so that the user equipment responds differently during test mode than during normal operation, the user equipment can take desired actions during testing. For example, in response to receiving a given protocol-compliant cellular network message with the user equipment, action can be taken in the user equipment that differs from an appropriate protocol-compliant action to receipt of the given protocol-compliant cellular network message during normal operation of the user equipment in communications with a cellular telephone base station in a cellular telephone network. Similarly, any suitable data may be encoded during the process of transmitting network messages from user equipment 14 to test equipment 12 during test operations (e.g., other radio-frequency signal power values, voltage values can be encoded, the values of device settings can be encoded, etc.). Because data is uploaded from equipment 14 to device 12 differently than with existing network message schemes, more information can be conveyed with system 10 than when using conventional test arrangements and the use of overly complex test equipment is avoided.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for performing over-the-air testing of user equipment using a radio communications tester, comprising:
   wirelessly receiving a given code-division-multiple-access protocol-compliant cellular network message with the user equipment; and in response to receiving the given code-division-multiple-access protocol-compliant cellular network message with the user equipment, responding to the code-divisional-multiple-access protocol-compliant cellular network message with a test-specific action that differs from a response in a normal user mode, wherein the response in the normal user mode is to change to use of a code-division-multiple-access communication code specified by the given code-division-multiple-access protocol-compliant cellular network message.

2. The method defined in claim 1, further comprising:
transmitting a wireless radio-frequency test signal;
receiving the wireless radio-frequency test signal with an antenna and providing the received wireless radio-frequency test signal to the receiver input, wherein responding to the code-divisional-multiple-access protocol-compliant cellular network message with the test-specific action comprises:
measuring the wireless radio-frequency test signal at the receiver input to produce a measured power value; and
wirelessly transmitting the measured power value in one of a plurality of fields in a code-division-multiple-access network message.

3. The method defined in claim 2, wherein wirelessly transmitting the measured power value in the one of the plurality of fields in the code-division-multiple-access network message comprises wirelessly transmitting a code in an intercode handover command that is mapped to the measured power value.

4. The method defined in claim 2 wherein wirelessly transmitting the measured power value in the one of a plurality of fields in the code-division-multiple-access network message comprises wirelessly transmitting the measured power value in a pilot measurement message indicator.

5. The method defined in claim 1, wherein wirelessly receiving the given code-division-multiple-access protocol-compliant cellular network message with the user equipment comprises:
receiving a code in an intercode handover command that directs the wireless electronic device to measure the wireless radio-frequency test signal at the receiver input to produce the measured power value.

6. A method for using test equipment to perform over-the-air testing of user equipment with the test equipment, wherein the user equipment has a receiver with a receiver input, comprising:
with the test equipment, transmitting a wireless radio-frequency test signal of a predetermined power;
with the user equipment, receiving the transmitted radio-frequency test signal using an antenna and providing the received radio-frequency test signal from the antenna to the receiver input, wherein the received radio-frequency test signal has a received power at the receiver input; and
with the test equipment, transmitting a wireless protocol-compliant network message with the test equipment that directs the user equipment to measure the received power, wherein transmitting the wireless protocol-compliant network message comprises transmitting a code-division-multiple-access protocol-compliant network message, and wherein transmitting the code-division-multiple-access protocol-compliant network message comprises transmitting a code in an intercode handover command that directs the user equipment to measure the received power.

7. The method defined in claim 6 further comprising:
receiving the wireless protocol-compliant network message with the user equipment; and
measuring the received power in response to receiving the wireless protocol-compliant network message with the user equipment.

8. The method defined in claim 7 wherein measuring the received power produces a measured value of the received power, the method further comprising:
wirelessly transmitting the measured value of the received power from the user equipment to the test equipment.

9. The method defined in claim 8 wherein transmitting the measured value comprises transmitting the measured value using at least one protocol-compliant network message.

10. The method defined in claim 8 wherein transmitting the measured value comprises transmitting the measured value in a field of a pilot measurement message indicator.

11. The method defined in claim 8 wherein transmitting the measured value comprises transmitting a code in an intercode handover command that is mapped to the measured value.

12. A method for performing over-the-air testing of user equipment using a code-division-multiple-access radio communications tester, comprising:
with an antenna and a receiver having an input in the user equipment, receiving a wireless radio-frequency test signal and making a corresponding radio-frequency test signal power measurement to produce a measured power value that is indicative of how much power the received radio-frequency test signal has at the input;
transmitting an intercode handover command from the code-division-multiple-access radio communications tester to the user equipment that directs the user equipment to make the radio-frequency test signal power measurement; and
transmitting the measured power value to the code-division-multiple-access radio communications tester in at least one code-division-multiple-access network message.

13. The method defined in claim 12 wherein transmitting the measured power comprises transmitting the measured power in a pilot measurement message indicator field.

14. The method defined in claim 12 wherein transmitting the measured power comprises transmitting a code in an intercode handover command that is mapped to the measured power.

15. The method defined in claim 14 further comprising transmitting a code in an intercode handover command from the code-division-multiple-access radio communications tester to the user equipment that directs the user equipment to make the radio-frequency test signal power measurement.

* * * * *